US007522675B2

(12) United States Patent
Sheynman et al.

(10) Patent No.: US 7,522,675 B2
(45) Date of Patent: Apr. 21, 2009

(54) DIGITAL CONTENT PREVIEW GENERATION AND DISTRIBUTION AMONG PEER DEVICES

(75) Inventors: Arnold Sheynman, Glenview, IL (US); Robert Patzer, Lake Zurich, IL (US); Kevin Mowry, Irving, TX (US)

(73) Assignee: Motorola, Inc., Schaumburg, IL (US)

( * ) Notice: Subject to any disclaimer, the term of this patent is extended or adjusted under 35 U.S.C. 154(b) by 768 days.

(21) Appl. No.: 10/331,290

(22) Filed: Dec. 30, 2002

(65) Prior Publication Data

US 2004/0128324 A1 Jul. 1, 2004

(51) Int. Cl.
*H04L 27/00* (2006.01)
(52) U.S. Cl. ............... 375/295; 709/230; 709/231; 725/112; 725/118; 725/135
(58) Field of Classification Search .......... 375/295, 375/240.01, 240.12, 240.25, 240.23; 348/588, 348/593; 709/205, 231, 230; 386/52; 725/135, 725/118, 112
See application file for complete search history.

(56) References Cited

U.S. PATENT DOCUMENTS

| | | | | |
|---|---|---|---|---|
| 5,189,516 | A * | 2/1993 | Angell et al. | 348/588 |
| 6,366,914 | B1 * | 4/2002 | Stern | 707/10 |
| 6,372,974 | B1 | 4/2002 | Gross et al. | 707/200 |
| 2001/0004417 | A1 * | 6/2001 | Narutoshi et al. | 386/52 |
| 2002/0026479 | A1 * | 2/2002 | Aoki et al. | 709/205 |
| 2002/0114465 | A1 * | 8/2002 | Shen-Orr et al. | 380/231 |
| 2003/0065802 | A1 * | 4/2003 | Vitikainen et al. | 709/231 |
| 2004/0249768 | A1 * | 12/2004 | Kontio et al. | 705/65 |

OTHER PUBLICATIONS

"Digital Rights Management and Superdistribution of Mobile Content", Nokia estimate expressed at 3GSM World Congress, Feb. 2001, 8 pages.
"entensible rights Markup Language (XrML) Example Use Cases Nov. 20, 2001", http://www.xrml.org/spec/2001/11/ExampleUseCases.htm, 13 pages.
"Digital Rights Management Version 1.0", Proposed Version Jun. 28, 2002, Open Mobile Alliance, Ltd., 20 pages.
Oren Levine, "Rel Permission Semantics Compared", Nokia Mobile Phones/Mobile Software, Dec. 5, 2002, 4 pages.

* cited by examiner

*Primary Examiner*—Ted Wang
(74) *Attorney, Agent, or Firm*—Roland K. Bowler, II

(57) ABSTRACT

Methods and devices for end-user generation of content previews including selecting digital content stored on a communications device, and generating a content preview on the communications device from the digital content selected based on content transcoding information. In one embodiment, a mobile wireless communications device (300) includes a content preview generator (340) for generating content previews from content stored in memory based on content transcoding information, and a transmitter (380) for sharing the content previews with other mobile wireless communications devices, for example, in peer-to-peer communications.

8 Claims, 3 Drawing Sheets

DIGITAL CONTENT PREVIEW GENERATION AND DISTRIBUTION AMONG PEER DEVICES

FIELD OF THE DISCLOSURE

The present disclosure relates generally to the communication of digital content, and more particularly to sharing digital information that may be the subject of rights protections among communications devices, including peer-to-peer transfers of copyright protected digital content, and methods therefor.

BACKGROUND

The transfer of copyright protected digital content is known generally. Presently, content providers are the only source for content previews, which may usually be transferred freely. Content preview recipients may obtain complete access to the corresponding content and corresponding rights from a content server or some other source only upon payment of a content license fee.

U.S. Pat. No. 6,372,974 entitled "Method And Apparatus For Sharing Music Content Between Devices" discloses peer-to-peer transfers of copyright protected content. In U.S. Pat. No. 6,372,974, where only a single user license exists, the copyright protected content is removed from the device from which it is transferred upon verification that the content has been successfully transferred to or copied by a receiving device. Where multiple user licenses have been granted, the number of content copies transferred is controlled by decrementing a counter on the transferring device each time a copy of the content is transferred successfully.

A Nokia publication entitled "Digital Rights Management And Superdistribution of Mobile Content" discusses the evolution of digital content protection from control over content delivery to control over content usage. In content delivery control architectures, an application server downloads content to a purchasing terminal upon payment confirmation by a payment collector, for example, a network operator. Delivery of protected content beyond the purchasing terminal is prohibited by a content forward-lock, which prevents the content or copies thereof from being re-transmitted by the original recipient. Content delivery control schemes have been used to prevent the proliferation of pirated cellular handset ringtones.

According to the Nokia publication, in content usage control architectures, content usage rights are expressed in vouchers, which may be created and distributed separately from the content. According to this architecture, the content is registered by or with a voucher server. Payment for issued vouchers is collected by a payment collection entity, for example, a cellular communications network operator. Registered content previews may be transferred freely among terminals in peer-to-peer communications and viewed without a voucher, but the content may be fully accessed only upon purchasing a voucher from the payment collection entity.

A CONTENTGUARD publication entitled "eXtensible rights Markup Language (XrML) Example Use Cases 20 Nov. 2001" discusses, in Section 4.15 thereof, a content superdistribution model wherein an original content consumer retains content rights, but subsequent content recipients must acquire rights to use the content. In Section 4.16, another content superdistribution model specifies how many content copies a distributor may make.

The various aspects, features and advantages of the present inventions will become more fully apparent to those having ordinary skill in the arts upon careful consideration of the following Detailed Description of the Invention with the accompanying drawings described below.

DETAILED DESCRIPTION

The disclosure pertains generally to the management and distribution of digital content, including the generation and sharing of content previews by and among peer communications devices, for example, mobile wireless communications devices, including cellular telephones, two-way pagers, personal digital assistants (PDAs), etc., among other wireless communications devices.

The management and distribution of digital content, and the generation and sharing of content previews is, however, not limited to mobile communications devices. The invention is applicable more generally to fixed-location peer communications devices that communicate wirelessly or by wirelines, for example, Internet subscribers and other networked client devices. The terms communications device and peer communications device refer generally to these and other fixed and mobile communications devices.

Figure 1:
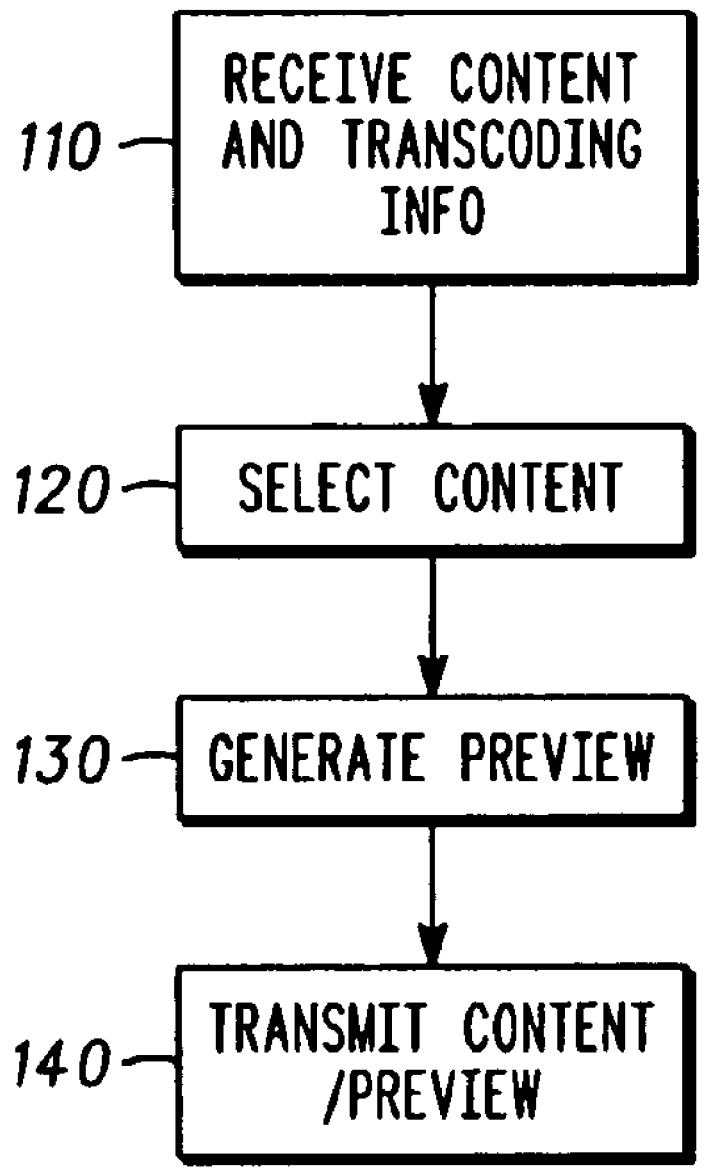
FIG. 1 is a process flow diagram for exemplary modes of operation.

In the process flow diagram 100 of FIG. 1, at block 110, a communications device receives digital content, for example, audio or video or multi-media files or any other digital content. The digital content is generally stored on the communications device, for example, in non-volatile memory or on a hard disk drive or in some other storage media, depending upon the type and capabilities of the communications device.

In some embodiments, the digital content has associated therewith content transcoding information that specifies content preview generation parameters, as discussed more fully below. The content transcoding information is also received by the communications device, as indicated at block 110 in FIG. 1.

In some embodiments, the content transcoding information is an integral part of the content, and in other embodiments the content transcoding information is associated separately from the content. Thus the transcoding information may be transmitted with or without the content, although the transcoding information is generally required to generate content previews. In one embodiment, the content previews are generated at communications devices, for example, at mobile wireless communications devices or at some other communications device for peer-to-peer distribution as discussed further below.

In one embodiment, the content transcoding information is a data structure that enables the generation of content previews from digital content. In embodiments where the content transcoding information is separate from the content, the transcoding information data structure includes content identification information associating it with corresponding content. The transcoding data structure may also include other data elements, for example, digital content preview generation information specifying limitations on content previews generated for the corresponding digital content with which the digital content transcoding data structure is associated. These and other aspects of the transcoding information are also discussed further below.

Generally, the content may or may not be the subject of rights protection, for example, copyright protection. If the content is copyright or otherwise protected, the content recipient may also receive rights associated with the content, for example, the right play or view the content, and in some cases the right to reproduce and distribute the content, the right to create derivatives from the content, including content previews, among other transferable rights.

Figure 2:
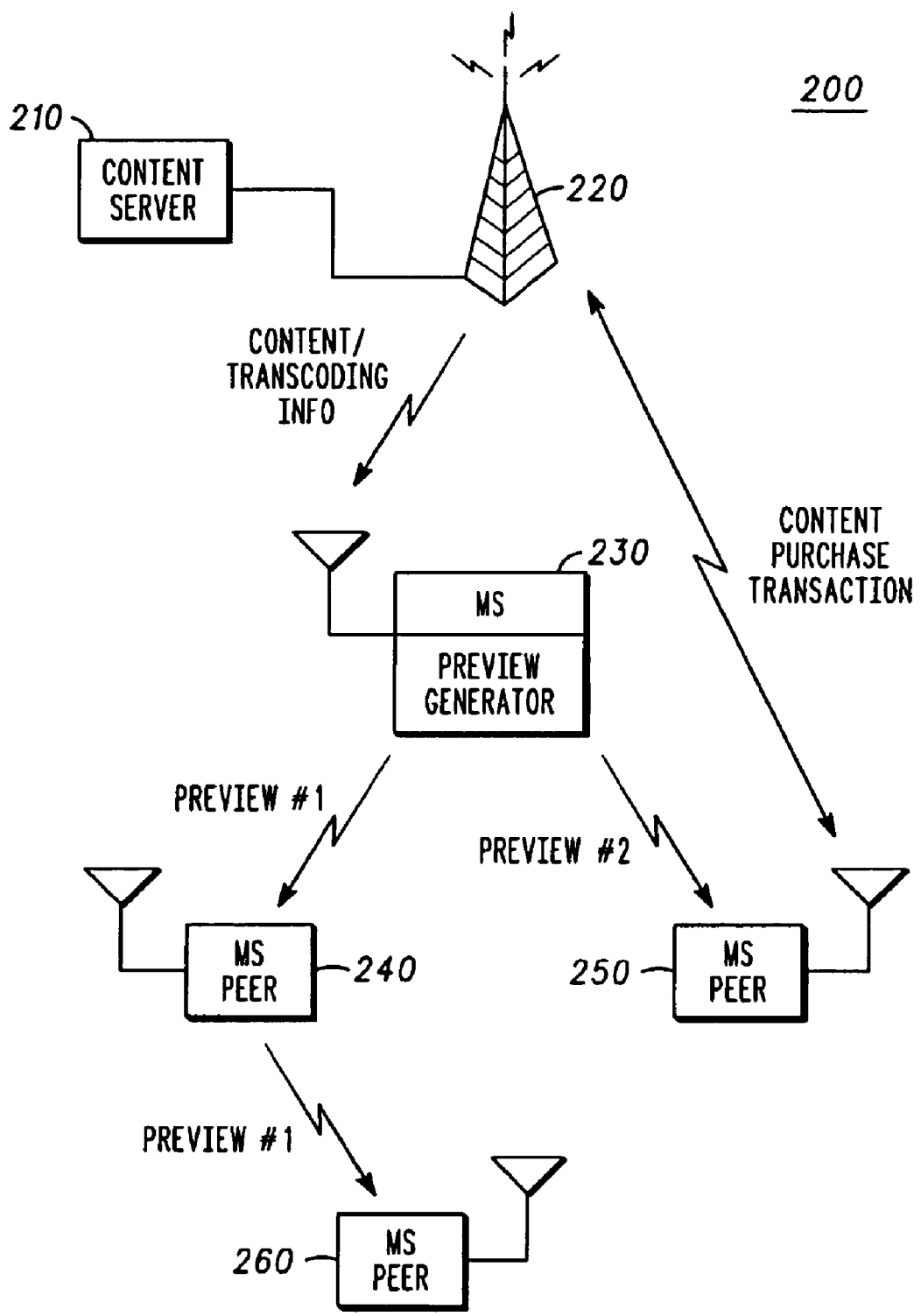
FIG. 2 is an exemplary communications architecture.

In the exemplary communications system architecture 200 of FIG. 2, the content and any associated rights and transcoding information is provided from a content server 210 to a mobile wireless communications device 230 via a cellular communications network, which generally includes terrestrial base station transceivers 220 and other infrastructure, which is known generally but not illustrated. The mobile wireless device 230 thus receives content via a cellular radio transceiver of the device.

In other architectures, the content and its associated information is received by other types of radio receivers, for example, by one of the IEEE 802.11 variety receivers or by a Bluetooth receiver. Alternatively, the content may be communicated over a wire-line, for example, to a subscriber connected to the Internet or to another network or server via a telephone line or cable modem connection, etc. In other embodiments, the device may receive the content device by other modes of communication, for example, the content may be flashed to storage media on the device. Alternatively, firmware containing the content may be installed on the device.

In FIG. 1, at block 120, digital content stored on the communications device is selected either for transmission or for generation of a corresponding content preview. At block 130, a content preview is generated on the mobile wireless communications device from the digital content selected. The selection of the content and the generation of the content preview is performed by a user at a user interface of the communications device, for example, using a preview generating application stored in device memory and operated by a digital processor.

The content preview generated for the selected digital content is created by the communications device user, for example, a licensed content recipient, rather than by the content provider. In some embodiments, the preview creator has a wide range of discretion in the creation of the preview, whereas in other embodiments the creator does not. Generally, the content creator may distribute the content preview to others, for example, in peer-to-peer communications.

The content preview is generated at the communications device based upon associated transcoding information that enables the generation of preview content for the associated digital content. The content transcoding information also specifies, among other things, limitations on content preview generation, for example, by specifying broad or narrow ranges of content preview variables that may be selected by a content preview creator. Thus in some embodiments the transcoding information permits the generation of content previews having substantial degrees of customization, as suggested. In other embodiments, however, the content transcoding information may strictly limit the degree of customization of the content preview, for example, by allowing the generation of only one pre-determined type of content preview.

Exemplary variables that may be specified by the content transcoding information include, for example, identification of one or more portions of the digital content that may be selected for inclusion in content previews. For example, only specific portions of a video clip or audio file may be available for incorporation in a content preview. Any portions of content that must be included in the content preview may also be identified. Thus certain content portions may be required and others may be optional.

Other variables that may be specified by the transcoding information include the time duration of the content preview, or the number of video frames or amount of text, etc. These and other variables may be specified as being required or optional, and may be specified in ranges, for example, in terms of minimums and/or maximums, or otherwise. Other variables or elements, including color, content preview expiration period, image and/or audio quality, etc., may also be specified. The transcoding information may also include addresses of sources where the content may be obtained, for example, an IP/TCP uniform resource locator (URL), or other network address.

Generally these and many other aspects of the content preview generation may also be controlled by the content transcoding information, depending on the desired level of control over the previews. The transcoding information is generally specified or defined by the content creator or assignee or some other party having control over the content, for example, a licensee.

In some embodiment, rights are also conveyed by the content transcoding information, for example, the right to play or view content, and in some cases the rights to reproduce and distribute content, the right to derive other works from the content, including, among other rights, the right to produce or generate content previews. Some of the rights granted may have limits associated therewith, for example, limits on the number of content copies or previews that may be produced and distributed. In other embodiments, the rights are granted by other means, some of which are known.

Generally, depending upon the rights granted, the creator of the content preview may generate multiple content previews each of which are different. In some embodiments, for example, the creator may generate content previews based upon the selection of different portions of multimedia content for inclusion in corresponding content previews. The creator may thus create customized previews for distribution to different audiences, wherein the content previews are tailored to appeal specifically to the respective recipients.

In FIG. 1, at block 140, content or a content preview is transmitted from the communications device, for example, to another communications device. In the exemplary architecture of FIG. 2, the mobile wireless communication device 230 generates a plurality of at least two different content previews, preview #1 and preview #2, and transmits them to corresponding first and second peer mobile wireless communications devices 240 and 250, respectively. More generally, the previews may be transmitted to any other device, for example, to fixed location Internet subscribers or to an RF enabled notebook computer, or to a two-way pager, or to some other peer communications device.

In one embodiment, content previews may be distributed freely by or from the device on which the previews were created. In some embodiments, the previews may be distributed freely by the device on which the previews were created without the loss of any rights associated with the content from which the previews were generated. In some embodiments, the previews created on the device may be distributed only once, for example, by using a forwarding lock. In other embodiments, there is no limit on the number of previews that may be distributed by the creator, wherein previews may be freely distributed indefinitely. For example, a recipient peer communication device may forward a preview, or copies thereof, to other peer devices, which may also distribute and/or copy it. In FIG. 2, peer device 240 forwards or sends a copy of the first preview to another peer device 260.

Any content preview recipients interested in obtaining full rights to the content may purchase the content and its corresponding rights from a content server or from some other source, for example, from a preview creator possessing rights to distribute copies of the original content. In some embodiments, the content preview includes or identifies one or more sources, for example, web addresses, from which the content may be purchased or otherwise obtained. In FIG. 2, peer communication device 250 engages in a content purchase transaction with content server 210 via base station 220 to obtain the content of the second preview.

Figure 3:
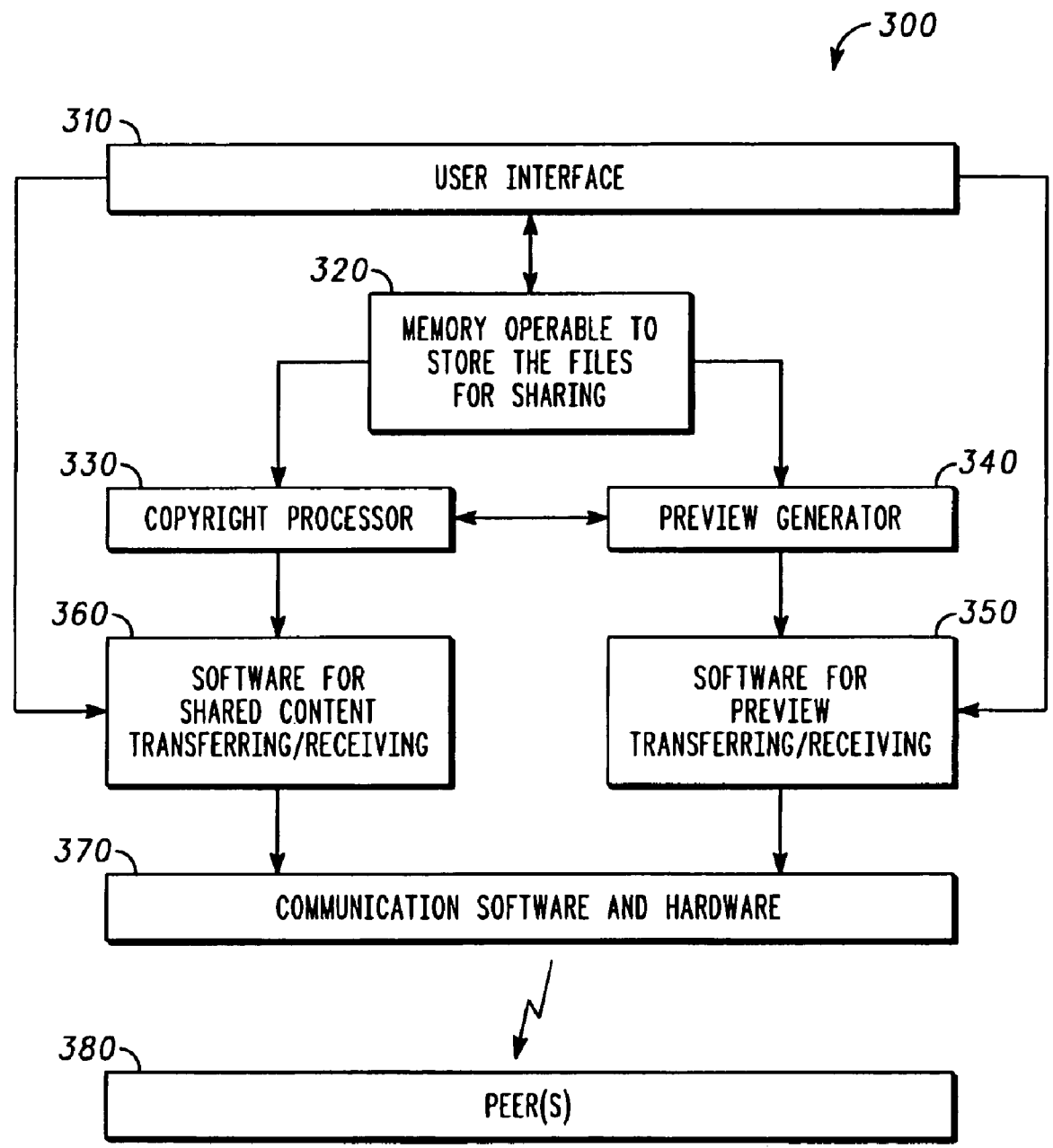
FIG. 3 is an exemplary mobile wireless communications device architecture for generating and distributing content previews.

FIG. 3 is an exemplary mobile wireless communications device architecture 300 capable of generating content previews. The exemplary mobile wireless communications device comprises generally a user interface 310 from which a user selects content from which, or for which, a content preview will be created or generated on the device. The content selected is generally stored in memory 320, which is typically RAM or some other storage media.

In embodiments where the content selected is copyright protected, the content selection is also communicated to a copyright processor 330, which is typically implemented as software, that determines whether content preview generation is permissible. More generally, the copyright processor manages rights associated with the generation and distribution of content previews and in some embodiments the content per se.

In some embodiments, the copyright generator determines the number of previews that may be generated for distribution (NP), and accounts for the generation and distribution thereof. For example, the copyright generator may decrement a rights counter that counts the number of previews generated. In one embodiment, if NP>0, preview generation is permitted based upon the corresponding transcoding information, or rules, which are also stored in memory, and NP is decremented for each preview generated. Content previews may be generated by the device until NP=0, whereupon additional right must be obtained, for example from a content server. Similar processing maybe performed by the copyright processor for the copying and distribution of content, for example, in applications where the user possesses rights for copying and distributing content.

In one embodiment, a preview generator 340 is activated by the copyright processor 330 or by an input at the user interface 310 in response to an input, for example, content selected by the user. The content preview is generated based upon input selections by the user at the user interface 310, within the limitations of the transcoding information, as discussed above. If preview generation is not authorized, e.g., if NP=0, or preview generation rights have not been granted, content preview generation is not permitted. If there is no limitation on the number of content previews generated, or if rights management by a copyright processor is not required, the preview generator may be activated immediately.

The preview generator 340 generates the preview by accessing content from the memory 320 based upon the transcoding rules and input at the user interface 310. When the content preview is generated, it is stored in memory, for example, in memory 320. In some embodiments, the user is notified by a communication from the preview generator to the user interface. In FIG. 3, the copyright processor 330 and preview generator 340 are depicted as discrete entities, although more generally these entities may be implemented in an integrated form, for example, as a software program.

In FIG. 3, the device architecture includes software 350 for receiving content and content previews and software 360 for sharing content and previews, via communications software and hardware 370, to peer devices 380. The software 350 and 360 may be integrated. In the exemplary mobile wireless communication device embodiment, the communication software and hardware is implemented as a wireless radio transceiver, but in other embodiments it could be a cable modem or some other communications device.

As noted above, recipients of the preview interested in receiving full content may reply with requests to the sender or to another content source, for example the content server. The distribution of only the content preview, which generally includes substantially less data than the complete content, correspondingly reduces communications bandwidth usage.

While the present inventions and what are presently considered to be the best modes thereof have been described in a manner that establishes possession by the inventors and that enables those of ordinary skill in the art to make and use the same, it will be understood and appreciated that there are many equivalents to the exemplary embodiments disclosed herein and that myriad modifications and variations may be made thereto without departing from the scope and spirit of the inventions, which are to be limited not by the exemplary embodiments but by the claims appended hereto.

What is claimed is:

1. A method for transferring digital content in peer-to-peer communications between a first peer communications device and a second peer communications device, comprising:
   selecting digital content stored on the first peer communications device,
   generating a content preview, at the first peer communications device, from the digital content selected, the content preview generated based upon content transcoding information associated with content from which the content preview is generated,
   the content transcoding information enabling generation of the content preview,
   transmitting the content preview from the first peer communications device to the second peer communications device.

2. The method of claim 1, generating the content preview by selecting a portion of the digital content selected for inclusion in the content preview from a user interface of the first peer communications device.

3. The method of claim 1, generating a plurality of at least two different content previews, at the first peer communications device, from the same digital content selected.

4. The method of claim 3, generating a plurality of at least two different content previews, at the first peer communications device, by selecting different portions of the selected digital content for inclusion in the corresponding content previews.

5. The method of claim 3, transmitting the plurality of at least two different content previews from the first peer communications device to at least one other peer communications devices.

6. The method of claim 1,
   the first peer communications device possessing a right to the digital content and a right to distribute the content preview generated,
   transmitting the content preview from the first peer communications device to the second peer communications device without relinquishing the right to the digital content.

7. A mobile wireless communications device, comprising:
   digital content and corresponding content transcoding information stored in memory,
   the content transcoding information permitting and specifying parameters for generating content previews from corresponding digital content;
   a content preview generator,
   the content preview generator generating content previews from content stored in memory based on the content transcoding information;
   a transmitter for sharing the content previews from the mobile wireless communications device.

8. The mobile wireless communications device of claim 7, the content preview generator generating content previews for the digital content selected only if the content transcoding information specifies that content previews may be generated.

* * * * *